Jan. 29, 1952            C. R. SMITH            2,583,714
AUTOMOBILE TURNING AND SUPPORTING CARRIAGE
Filed Oct. 26, 1946            3 Sheets-Sheet 1
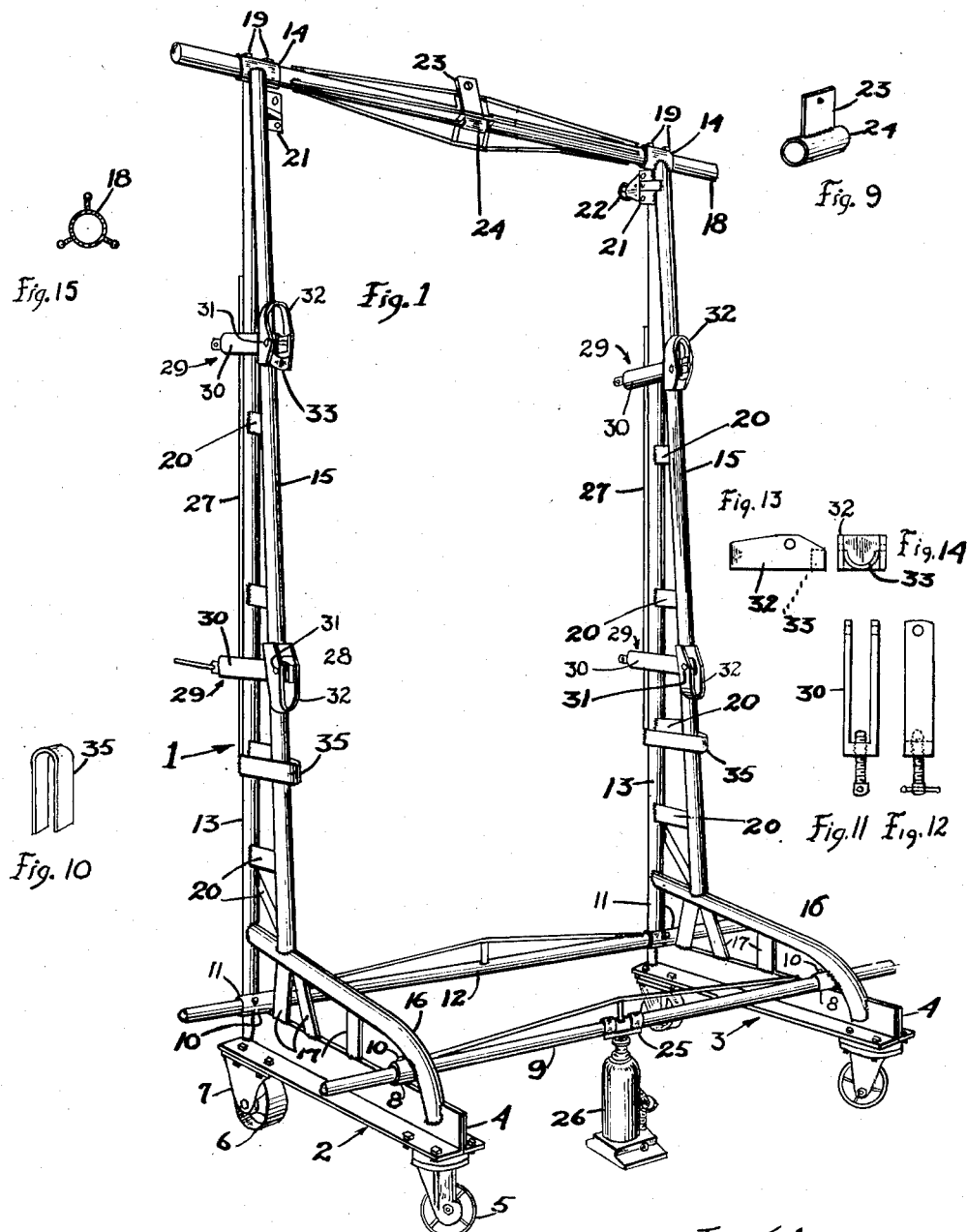
Inventor
Charles R. Smith
by H.J. Sanders
Attorney Jan. 29, 1952     C. R. SMITH     2,583,714
AUTOMOBILE TURNING AND SUPPORTING CARRIAGE
Filed Oct. 26, 1946     3 Sheets-Sheet 2
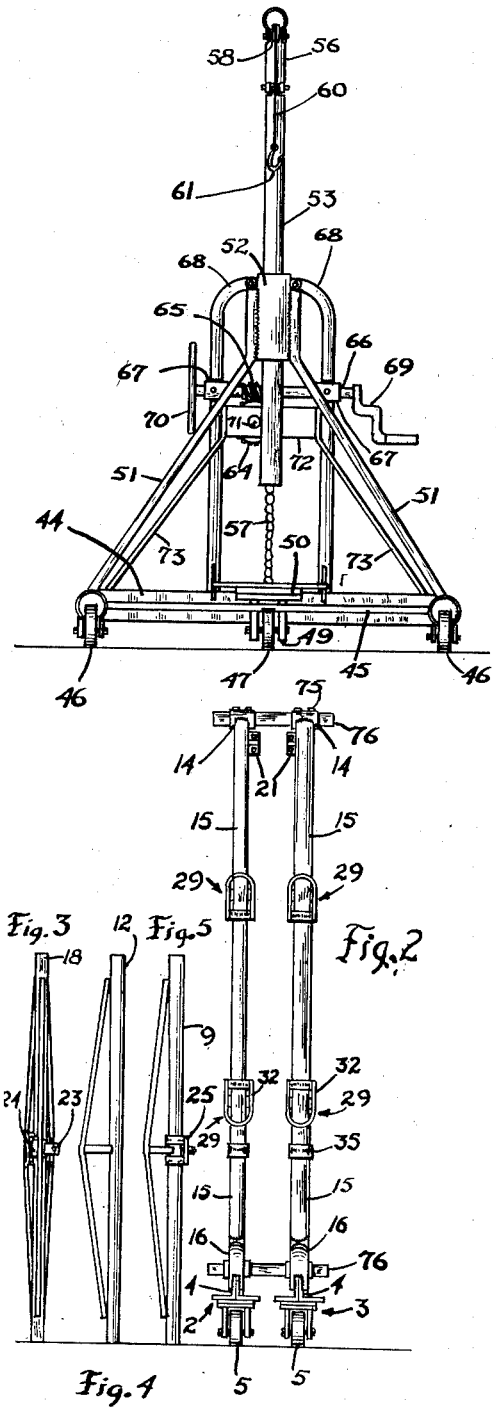
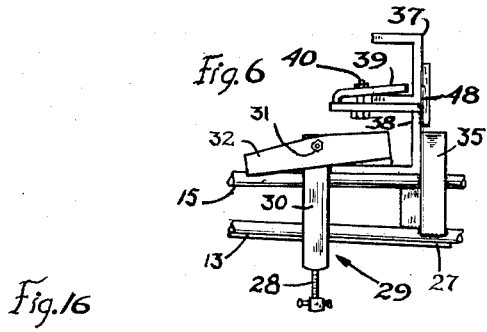
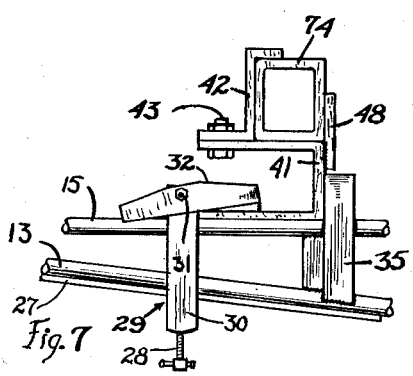
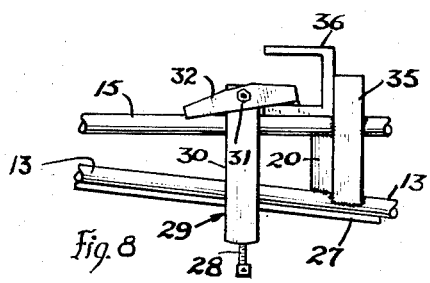
Inventor.
Charles R. Smith
by H. J. Sanders
Attorney.

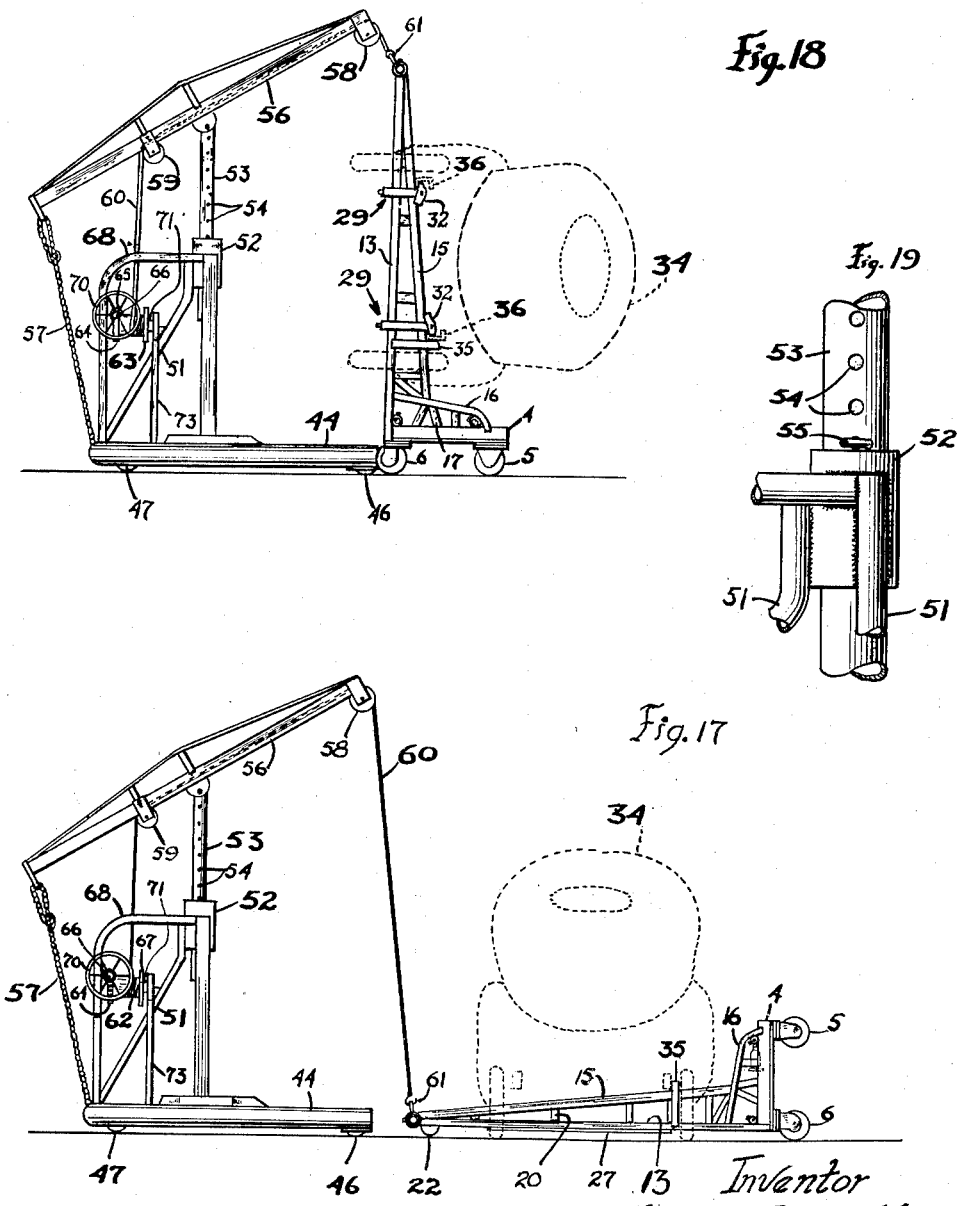

Patented Jan. 29, 1952

2,583,714

UNITED STATES PATENT OFFICE 2,583,714

AUTOMOBILE TURNING AND SUPPORTING CARRIAGE

Charles R. Smith, Chicago, Ill.

Application October 26, 1946, Serial No. 705,846

2 Claims. (Cl. 214—1)

This invention relates to improvements in vehicle turning and supporting carriages of a type adapted primarily for use in garages, repair shops and the like. The instant carriage is a portable mobile type readily movable from place to place in the garage or elsewhere and adapted to engage and lift, clear of the ground and to any angle desired, any automobile, truck or like vehicle to expose and make easily accessible all underneath, normally hidden parts to facilitate repairs, adjustments, replacements, rust proofing operations and the like.

One object is to provide a carriage of this type that can grasp the vehicle by the frame only and raise, turn, lower or adjust same to any angle desired, maintain positions selectively as long as desired, that starts the lift from the floor or ground and returns the vehicle to starting position without jar, jolt or material vibration. A further object is to provide a mobile carriage of light weight but having great lifting capacity that is compact in assembly, capable of operation by one attendant, inexpensive to manufacture, rugged and durable in assembly and so constructed and balanced as to be completely safe at all times in operation.

A further object is to provide a vehicle carriage comprising two separate independent normally detached mobile sections, one section adapted to be manually moved into position partly beneath the vehicle in the normal position thereof and to be readily secured to the frame to be raised together with same to the particular position desired; the second section adapted for hook-on engagement with the first named section to raise same with the vehicle to the said position and thereafter to be readily unhooked or detached therefrom and moved out of the way permitting free access to the supported vehicle from any vantage point, the vehicle engaging section now bearing the full vehicle weight and being well balanced, the weight being so distributed upon opposite sides of the center of gravity as to eliminate the possibility of overturning.

Movement of the loaded section by one attendant is now an effortless matter. Said mobile sections when connected together and in operation transmitting a compensating degree of movement from one to the other to effectively maintain equilibrium.

A still further object is the provision of a mobile vehicle carriage that occupies but little space in use or at rest and in the latter position may be collapsed or reduced to occupy a floor space of substantially eighteen by forty-two inches and that then may be disposed in a corner or unused portion of the garage. Other objects, novel features and advantages of arrangement, construction and design comprehended by the invention are hereinafter more fully pointed out or made apparent from the following description of a preferred embodiment as illustrated in the accompanying drawings wherein like reference characters denote corresponding parts throughout.

In the drawings:

Fig. 1 is a view in perspective of the vehicle-engaging section of the carriage.

Fig. 2 is a front view of the frame alone of Fig. 1 in inoperative or collapsed position.

Figs. 3, 4 and 5 are detail views of the bridge beams connecting the sides of the frame of the section shown in Fig. 1.

Fig. 6 is an enlarged fragmentary view of Fig. 1 showing the means of engaging a channel type vehicle frame and supporting same.

Fig. 7 is a view similar to Fig. 6 but showing the means provided for supporting engagement with the box type of vehicle frame.

Fig. 8 is a view similar to Figs. 6 and 7 showing a channel type vehicle frame supported by this section.

Figs. 9 through 14 are detail views of various parts of the structure disclosed in Fig. 1.

Fig. 15 is a sectional view taken on the line 15—15 of Fig. 1.

Fig. 16 is a front view of the second section of the instant vehicle carriage.

Fig. 17 is a view in side elevation of the complete vehicle carriage, the vehicle-engaging section shown secured to the vehicle, the latter in dotted lines, ready to be raised therewith by means of the second section to the position shown in Fig. 18.

Fig. 18 is a view of Fig. 17 with the adjustable elements in an altered position and the vehicle disposed at a ninety degree angle to its Fig. 17 position, and, Fig. 19 is an enlarged fragmentary view of the frame assembly of the second section.

The vehicle-engaging section of the carriage includes the frame 1 operatively supported upon the base comprising parallel spaced carriages 2, 3, two in number, each including a pair of connected angle pieces whose upstanding engaging sides form a vertically disposed rail 4, one carriage wheel 5 being swivel connected, the remaining wheel running in fixed depending bracket 7. Secured to rails 4, 4 are the sleeves 8, 8 in which are removably and adjustably received the forward bridge bar 9 retained in adjusted position by set screws 10. Toward the rear end of the carriages also secured to the rails 4 are the sleeves 11 that adjustably support the rear bridge bar 12. Rising from each carriage normal thereto and secured to same at its rear end is a tubular member 13 vertically disposed in the normal position of said section upon its wheels 5, 6.

The said members 13 are of substantially greater length than the width of any standard automobile chassis and at their topmost ends carry sleeves 14 to which and to said ends the ends of the angularly disposed tubular members 15, 15 are secured, said tubular members diverging from members 13 as they recede from sleeves 14 and being received upon and terminally supported by the downwardly curved tubular supports 16 connecting members 13 to rails 4, said supports 16 being secured also to the said sleeves 8; braces 17 also connecting supports 16 and rails 4 and braces 20 connecting tubular frame members 13 and 15.

Adjustably received in said sleeves 14 is the bridge bar 18 releasably retained in position by set screws 19 and provided with a perforate handle 23 having the bar-engaging tubular portion 24. With the set screws 10 of sleeves 8 and 11 and set screws 19 loosened the carriages 2, 3 with tubular members 13, 15 may be adjusted laterally to vary the width of frame 1. Contiguous to sleeves 14, secured to members 13, 15 and offset slightly inwardly or toward each other are brackets 21 each carrying a roller 22 adapted in one position of the frame for contact with the floor. Secured by yoke 25 pivotally to bridge bar 9 and disposed therebeneath upon the floor is the small conventional hydraulic jack 26 adapted in operation to tilt the frame 1 and carriages 2, 3 pivotally upon wheels 6.

Secured to each tubular member 13 and extending longitudinally thereof remote from tubular member 15 is a flat plate 27 affording abutment for the screws 28 of clamps 29 received in clamp forks 30 that adjustably encompass said plates 27 and members 13 and 15 and that at their open ends are secured by bolts 31 to U-shaped shoes 32 that at their closed ends bear directly upon said tubular members 15, said shoes having at their open ends the semi-circular collars 33 shaped complementary to the periphery of tube 15 upon which they are received.

Four clamps 29 are provided, of identical construction, for adjustable selective detachable engagement with the sides of frame 1 for supporting engagement with the frame of a vehicle 34 being or about to be serviced. Secured permanently to the members 13 substantially below their longitudinal central portions are the braces 35 extending about and beyond members 15 to which they are also secured, said braces being directly opposite each other and two in number and adapted for cooperation with the said clamps in supporting the vehicle. There are four clamps 29, two for engagement with each side of the vehicle frame A channel type frame 36, Figs. 6 and 8 is shown where this type is accessible beneath the vehicle for engagement by the frame 1 and clamps 29 directly; a second channel type 37 so positioned relative to the vehiclebody as to require the employment of an U-shaped extension 38 with fingers 39, 48 and bolt 40 is shown in Figs. 6; and a box type frame 74 requiring the employment of a finger 48, extension links 41, 42, U-shape and Z-shape respectively, connected by bolt 43 is shown in Fig. 7. In adjusting clamps 29 upon the frame 1 the lower set of clamps that engage one side of the vehicle frame are spaced from braces 35 a distance equal to the width of one side of the vehicle frame with the other or upper pair of clamps spaced from the lower pair of distance equal to the width of the vehicle frame.

The actuating or lift section includes the U-shaped tubular frame 44, the sides connected by brace 45, supported by wheels 46 at its ends and a rear end wheel 47 supported in bracket 49 depending from platform 50. Angular supports 51, preferably two in number, rising from said frame support the tubular vertically disposed guide 52 in which is adjustably received the hollow standard 53 formed with vertical rows of perforations 54 selectively receiving the pin 55 the ends of which extending beyond said standard rest upon the top end of guide 52 to support said standard in adjusted position.

Fulcrumed to the upper end of said standard is the beam 56 to one end of which the anchor chain 57 is adjustably secured connecting said beam to the said frame 44, said beam at its forward end having a sheave 58 and between its fulcrum point and rear end a second and like sheave 59, a cable 60 passing over said sheaves having a hook 61 at one end, said cable extending downwardly from sheave 59 to and about a cable drum 62 having a flange 63 at one end and a sprocket 64 upon its opposite end in engagement with the worm 65 of shaft 66 journaled in bearings 67 supported by auxiliary frame 68 rising from said base 44, said shaft having a hand crank 69 at one end and a hand wheel 70 at the opposite, either serving to rotate said shaft, the shaft 71 of said cable drum being operatively supported in castings 72 supported by angular braces 73 rising from base 44 and by a like casting connecting the auxiliary frame members 68.

The normal position of the vehicle-engaging section of the carriage is that shown in Figs. 1 and 18 supported upon its wheels 5, 6, with the jack 26 disposed upon the floor and pivotally connected to yoke 25. To engage same with a vehicle to be raised the lower set of clamps 29 are spaced from frame 1 with their forks 30 a distance from braces 35 corresponding to the width of one side of the vehicle frame if the type of channel frame 36, readily accessible, is encountered, or a distance to accommodate an extension 38 or 41 if the frame types 37 or 74, respectively, are encountered. The hoist section is now manually moved from its normal position into the position shown in Fig. 17 with the frame 1 resting upon wheels 6 and rollers 22. The frame 1 is now moved beneath the vehicle 34 and, in the case of channel frame 36, the shoes 32 and braces 35 engaged with said frame and the screws 28 tightened against plates 27 and the upper pair of clamps having been spaced from the lower pair to correspond to the width of the vehicle frame likewise applied and secured to the opposite side of said frame.

If the type of frame 74 is encountered the extension link 41 with finger 48 and link 42 are applied thereto, as shown, the bolt 43 then being tightened as well as clamp 29 and the frame is firmly engaged at two points upon each frame side. If the type of frame 37 is encountered the fingers 39 and link 38 are secured by bolt 40 to this frame and clamp 29 tightened at each of the four points of frame engagement. The types of frame engagement are readily effected by a mechanic or attendant from a position upon the floor and partly beneath the car. The actuating or lift section is now brought into play. With the beam 56 tilted to the angle desired, an effective position being disclosed in Figs. 17 and 18 the hook 61 at the end of cable 60 is engaged with the handle 23 of bridge bar 18, the standard 53 having been adjusted to the heights desired. Rotation of the hand wheel 70 or crank 69 will rotate worm 65 to turn drum 62 through the medium of engaged teeth 64 thus, from the position shown in Fig. 17, raising the frame 1 gradually from horizontal to vertical position and positioning the base upon its four wheels 5, 6.

Both sections of the carriage are readily movable upon their wheels and while a load is being raised or lowered the movement of the section under load is transmitted to a degree to the lift section so that an automatic adjustment of one section to the other section is effected, this movement compensating fully for the floating center of gravity of the carriage in operation under load and serving to properly balance same contributing greatly to the absolute safety of the device in use. The bulk of the weight of the vehicle when supported in the position shown in Fig. 18 is disposed directly over the base upon both sides of the center of gravity so that there is no danger of over-balance after the lift section has been disconnected by releasing hook 61 from handle 23.

The lift section may now be moved to an out of the way position to afford clear access to the vehicle from all points. As the vehicle-engaging section with its load approaches the position shown in Fig. 18 the jack 26, vertically disposed and in extended position, will first encounter the floor and its slowly descending piston will fully cushion any shock that might otherwise occur as the base wheels meet the floor. On return movement to position the vehicle again upon the floor the jack is used to start the tilting movement of the base wheels 5 and base to a position where the movement is taken up by the lift section without shock or jolt. In the folded or collapsed position of the frame, Fig. 2, with the bridge bars 9, 12, 18 removed the frame sides and carriages of the base are secured together for storage or shipping by the stub bars 76 releasably secured in position by set screws 75.

What is claimed is:

1. In an adjustable automobile turning and supporting carriage for vehicles having channel-type frames, a wheeled base, tubular members secured to the sides of said base at one end thereof normal thereto, curved supports connecting said tubular members and said wheeled base, additional tubular members connecting said first named tubular members and said curved supports, said additional tubular members disposed at an angle to said first named tubular members and diverging therefrom as they approach said curved supports, braces connecting said first named tubular members and said additional tubular members and extending beyond said additional tubular members for engagement with the vehicle frame, plates secured to said first named tubular members, a plurality of clamps adjustably connecting said first named tubular members to said additional tubular members and bearing upon said plates for engagement with the vehicle frame, two only of said clamps cooperating with said braces directly, said carriage in one position adapted for disposal beneath the vehicle for engagement with its frame, a bridge bar connecting tubular members at one side of said base to those at the opposite side, and a handle for said bridge bar.

2. In an adjustable automobile turning and supporting carriage, a wheeled base, a bridge bar at the forward end of said base, a frame at the rear end of said base normal thereto, rollers for said frame, said carriage in one position supported upon said base wheels only, said carriage in a second position supported upon said rollers and certain of said base wheels, vehicle frame engaging means carried by said frame operable in one position of the carriage to engage the vehicle frame, the carriage in said one position being engageable by lift means for movement to said second position, and a portable lifting jack secured to said bridge bar and operably disposed upon the floor in the second position of the carriage.

CHARLES R. SMITH.

REFERENCES CITED

The following references are of record in the file of this patent:

UNITED STATES PATENTS

| Number | Name | Date |
|---|---|---|
| 1,500,284 | Stubbs | July 8, 1924 |
| 1,618,923 | Griffith | Feb. 22, 1927 |
| 1,847,549 | Adams | Mar. 1, 1932 |
| 1,887,965 | Stoner | Nov. 15, 1932 |
| 1,893,822 | Guerriero | Jan. 10, 1933 |
| 1,920,989 | Layhon | Aug. 8, 1933 |
| 1,974,463 | Kintzley | Sept. 25, 1934 |